(12) United States Patent
Berger et al.

(10) Patent No.: US 7,533,639 B1
(45) Date of Patent: May 19, 2009

(54) DUAL CRANKSHAFT ENGINE WITH COUNTER ROTATING INERTIAL MASSES

(75) Inventors: Al Henry Berger, Brownstown, MI (US); James R Clarke, Levering, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 56 days.

(21) Appl. No.: 11/927,138

(22) Filed: Oct. 29, 2007

(51) Int. Cl.
*F02B 75/20* (2006.01)
*F02B 75/06* (2006.01)

(52) U.S. Cl. .................. 123/59.6; 123/192.1
(58) Field of Classification Search ............ 123/59.6, 123/192.1
See application file for complete search history.

(56) References Cited

U.S. PATENT DOCUMENTS

| | | | |
|---|---|---|---|
| 2,255,773 A | 9/1941 | Heftler | |
| 3,581,628 A * | 6/1971 | Williams | 123/59.6 |
| 4,509,474 A | 4/1985 | Schmuck | |
| 4,519,344 A | 5/1985 | Ohyama et al. | |
| 4,538,481 A | 9/1985 | Ohta et al. | |
| 4,688,441 A | 8/1987 | Yasukawa et al. | |
| 4,781,156 A | 11/1988 | Berger et al. | |
| 5,657,728 A | 8/1997 | Diggs | |
| 5,873,333 A | 2/1999 | Wittner | |
| 5,931,052 A | 8/1999 | Zhao et al. | |
| 6,189,493 B1 | 2/2001 | Gray, Jr. | |
| 6,286,473 B1 | 9/2001 | Zaremba | |
| 6,688,272 B2 | 2/2004 | Brevick et al. | |
| 6,732,697 B1 | 5/2004 | Berger | |
| 6,807,927 B2 | 10/2004 | Czysz | |
| 6,895,919 B1 | 5/2005 | Taxon | |
| 7,178,497 B2 | 2/2007 | Berger et al. | |
| 2007/0175419 A1 | 8/2007 | Ishimitsu | |

FOREIGN PATENT DOCUMENTS

| | | |
|---|---|---|
| CA | 637117 | 2/1962 |
| JP | 58211542 | 9/1983 |
| JP | 59200021 A * | 11/1984 |

* cited by examiner

*Primary Examiner*—Noah Kamen
(74) *Attorney, Agent, or Firm*—Diederiks & Whitelaw, PLC

(57) ABSTRACT

A dual crankshaft internal combustion engine is symmetrically constructed to form a perfectly balanced engine assembly. A first crankshaft, having a first end, a second end, and being formed of a shape and with a torsional flexibility, is housed within a cylinder block and connected to a first series of cooperating pistons and cylinders. A second crankshaft, having a first end and a second end, is formed of substantially the same shape as the first crankshaft and has substantially the same torsional flexibility as the first crankshaft. The second crankshaft is also housed within the cylinder block and connected to a second series of cooperating pistons and cylinders, while being positioned parallel to the first crankshaft, with the first end of the first crankshaft being positioned adjacent to the second end of the second crankshaft.

20 Claims, 6 Drawing Sheets

DUAL CRANKSHAFT ENGINE WITH COUNTER ROTATING INERTIAL MASSES

FIELD OF INVENTION

The present invention pertains to the art of internal combustion engines used in vehicles and, more specifically, to a balance and noise reduction system for a dual crankshaft engine.

BACKGROUND OF THE INVENTION

Conventional internal combustion engines employ piston and cylinder arrangements that tend to vibrate during operation. The vibration often creates a disturbance in a vehicle passenger compartment and is considered undesirable.

Most internal combustion engines develop power in impulses generated by the explosion of a combination of air and fuel in the engine's cylinders. The power is transferred to pistons that are located in the cylinders and are coupled to a rotating crankshaft with connecting rods. The power then flows to a flywheel that is connected to other downstream components of a powertrain. All conventional, single crankshaft, piston engines have a firing frequency vibration caused by uneven torque delivery to the flywheel. On a combustion or expansion event, the flywheel's rotational speed increases and, on a compression event, the rotational speed of the flywheel decreases. The torque that causes vibrational speed variations of the flywheel reacts against the cylinder block and causes torsional vibration of the cylinder block.

This fluctuating torque causes one source of vibration. Other disturbing engine vibrations are caused by unbalanced accelerations of internal engine components, especially linear accelerations of the piston masses within the cylinder bores. To address these problems, rubber engine mounts have been used to isolate the vehicle chassis from much of the cylinder block vibration. Still, some vibration is transmitted through the mounts and is sensed in the passenger compartment.

A partial solution is to have multi-cylinder engines generally configured so that the linear acceleration forces of the various pistons partially or completely cancel each other. Inline and opposed 6-cylinder engines, as well as inline and 90 degree V8 engines, usually have theoretically perfect balance of piston acceleration forces, but most other engines have residual unbalanced forces or moments. For example, all single crankshaft V6 engines with less than 180 degrees of bank angle have inherent unbalanced couples due to piston acceleration forces. Furthermore, all conventional single crankshaft engines have unbalanced torsional accelerations imposed upon the block structure due to flywheel rotational accelerations.

As an example, the Volkswagen 15 degree bank angle V6 engine is narrower than other 60 or 90 degree V6 engines and has a one-piece cylinder head that spans between two cylinder banks. However, there are numerous undesirable qualities with such a design. The intake manifold is on one side of the cylinder head and the exhaust manifold is on the other, causing three cylinders to have long intake and short exhaust passages while the other three cylinders have short intake and long exhaust passages. An asymmetry exists between the cylinder banks with regard to the location of the intake and exhaust valves. Further, one bank has mostly vertical intake valves and highly inclined exhaust valves, while the other bank has highly inclined intake valves and mostly vertical exhaust valves. Finally, the center planes of the cylinder bores intersect some distance below the crankshaft rotational axis, so that the cylinder bores on each bank are offset from the crankshaft axis in opposite directions. This arrangement causes the piston velocities in each of the two banks to be different. On one bank, the pistons are slower during upward motion than they are during downward motion. On the other bank, the pistons are faster during upward motion than they are during downward motion.

The use of two crankshafts in one cylinder block is not unprecedented. One example can be found in the Ariel motorcycle. The Ariel motorcycle was manufactured for many years with a dual crankshaft engine. This Ariel "Square Four" engine included two inline, two-cylinder crankshafts operating in a common cylinder block structure, with the resulting four cylinder bores being oriented in a square fashion. Each of the two crankshafts operates two pistons, with a 180-degree phase angle between the crankpins on each crankshaft. One pair of straight cut spur gears is arranged to couple the crankshafts to each other to make the crankshafts rotate in opposite directions. This arrangement has some apparent drawbacks. First, the arrangement is very noisy in operation because the single gearset has backlash and rattles each time the direction of torque transfer reverses. Also, because each cylinder bank contains only two cylinders, each bank of cylinders has a second order vertical shaking force that is in phase with the vertical shake of the other bank. Thus, the whole engine assembly has a second order vertical shake equivalent to that of an inline four cylinder engine. Furthermore, the two counter-rotating crankshafts do not carry equal amounts of rotating inertia so the firing pulse accelerations of the crankshafts produce a reaction on the engine's cylinder block.

Based on the above, there is a need in the art for a dual crankshaft engine that is well balanced and produces much less vibration than conventional engines, while avoiding the disadvantages set forth above.

SUMMARY OF THE INVENTION

The present invention is directed to a dual crankshaft internal combustion engine that is symmetrically constructed to form a balanced engine assembly. The dual crankshaft internal combustion engine comprises first and second series of cooperating pistons and cylinders mounted in a cylinder block. A first crankshaft, formed of a distinct shape and with a certain torsional flexibility, is positioned within the cylinder block and connected to the first series of cooperating pistons and cylinders. A second crankshaft is formed of substantially the same distinct shape as the first crankshaft and has substantially the same torsional flexibility as the first crankshaft. The second crankshaft is also positioned within the cylinder block, while being connected to the second series of cooperating pistons and cylinders and positioned parallel to the first crankshaft, with a first end of the first crankshaft being positioned adjacent to a second end of the second crankshaft.

A first gearset is mounted in the internal combustion engine connecting the first end of the first crankshaft to the second end of the second crankshaft, while a second gearset is mounted in the internal combustion engine connecting the second end of the first crankshaft to the first end of the second crankshaft. With this interconnection, the first and second crankshafts are configured to rotate in opposite directions. A first mass, having an associated inertia, is connected to the first end of the first crankshaft and a second mass, having substantially the same rotational inertia as the first mass, is connected to the first end of the second crankshaft. Preferably, the first mass is a motor/generator or a starter, and the second mass constitutes a flywheel or a torque converter. The first and second crankshafts are preloaded with a rotational tension stored in the torsional flexibility of each shaft to eliminate gear rattle. An alternative embodiment is to have a single gearset between the two crankshafts with one of the gears including a spring loaded scissors gear.

In operation, the cylinders preferably have a firing order where the piston motion is diametrically symmetrical. That is to say that the rear piston of the left cylinder bank has a motion that is substantially identical to and in phase with the motion of the front piston of the right cylinder bank. Likewise, the second piston from the rear of the left bank is in phase with the second piston from the front of the right bank, etc. Also, the total rotational inertia of the left bank crankshaft, including flywheel, torque converter, and other rigidly attached rotating parts is substantially equal to that of the right bank crankshaft with its rigidly attached rotating parts. In any case, with this construction, the engine assembly will have substantially perfect internal balance of piston forces, while also providing substantially perfect internal balance of crankshaft rotational moments.

Additional objects, features and advantages of the present invention will become more readily apparent from the following detailed description of a preferred embodiment when taken in conjunction with the drawings, wherein like reference numerals refer to corresponding parts in the several views.

DESCRIPTION OF PREFERRED EMBODIMENTS

Figure 1:
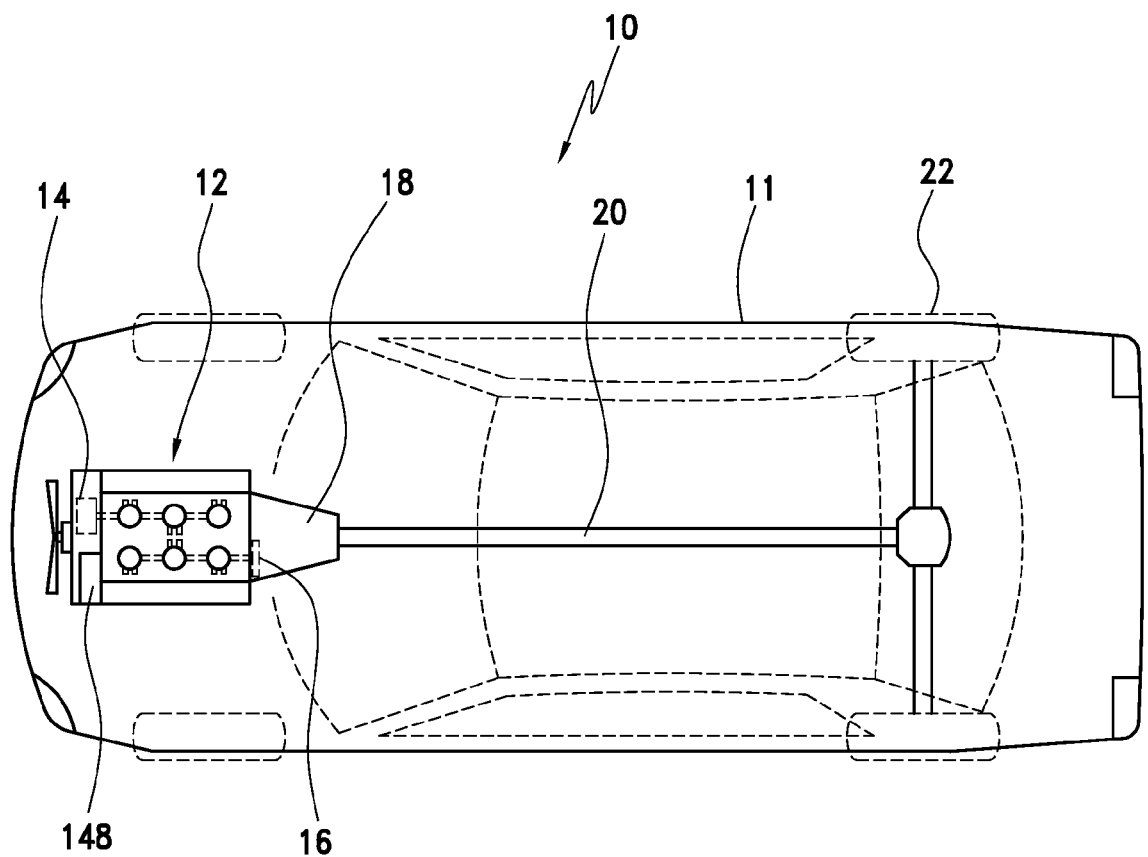
FIG. 1 is a schematic view of a vehicle incorporating a dual crankshaft engine embodying the invention.
Figure 2:
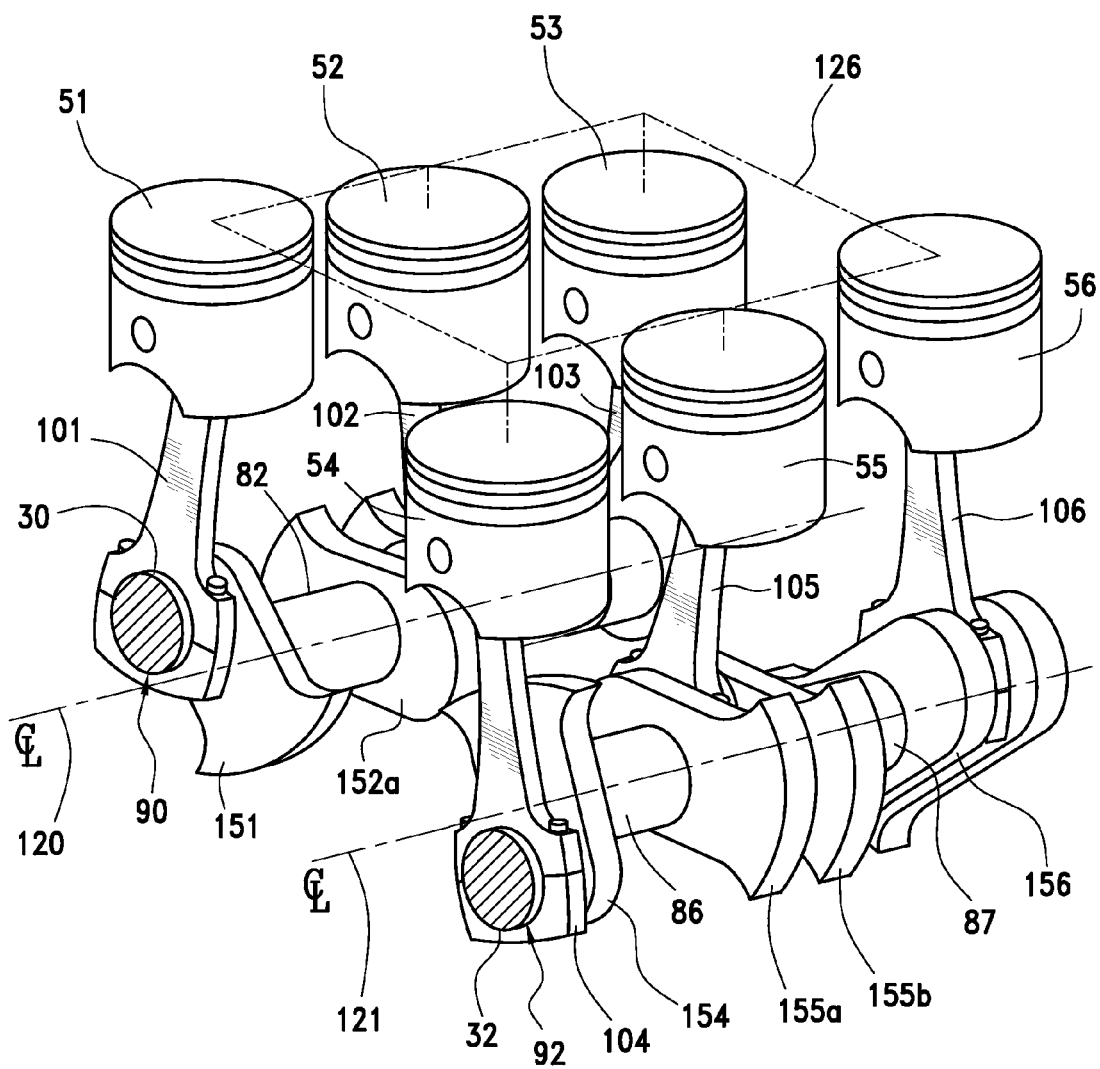
FIG. 2 is a simplified isometric view of the dual crankshaft engine of FIG. 1 shown in a simplified form with various parts of the engine, such as the valves and cylinders, being omitted so the moving parts of the engine attached to the crankshafts may be seen more easily.

With initial reference to FIG. 1, there is shown an automotive vehicle 10 having a body 11 and a dual crankshaft engine 12. The engine 12 is preferably attached to a first mass 14, having an associated inertia such as motor/generator or a starter motor. The engine 12 is also attached to a second mass 16, having an associated inertia, such as torque converter or a flywheel. The rotational inertia of the first mass 14 is preferably the same as the rotational inertia of the second mass 16. Power from the engine 12 is transmitted through the flywheel or torque converter to a transmission 18, then to the other portions of a powertrain 20 and eventually drives wheels 22.

Figure 4:
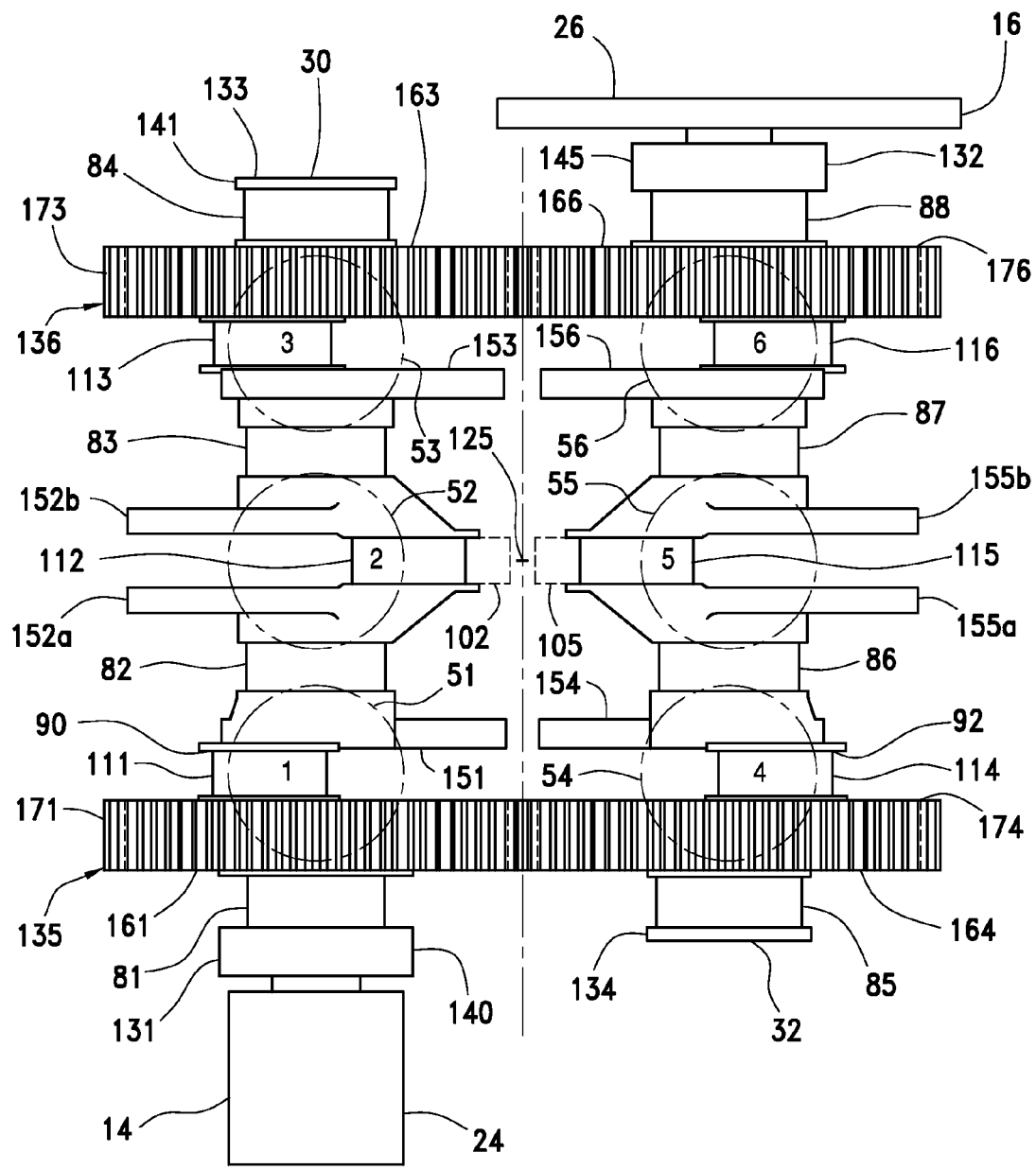
FIG. 4 is a downward looking cross-sectional view of the engine of FIG. 3 taken along line 4-4 showing more details of the crankshafts, along with added inertial masses including a torque converter and a starter/generator.

In FIG. 1, the vehicle 10 is shown as a rear wheel drive vehicle but, as will become readily apparent from the discussion below, any type of powertrain arrangement, including a front wheel or all wheel drive, could be used. At this point, it should be readily recognized that a flywheel would be commonly used as second inertia mass 16 with a manual type countershaft transmission, while a torque converter would be used when an automatic type transmission is employed. Similarly, the first mass 14 is preferably a motor/generator in the case of a hybrid vehicle, otherwise the first mass 14 is a starter. As more fully discussed below, the first mass 14 may also include a combination of other accessories that, when taken together, have the same inertia as the second mass 16. For simplicity in connection with describing the invention herein, the first mass 14 will generally be referred to as a motor/generator 24 and the second mass 16 will be generally referred to as a flywheel 26 as shown in FIG. 4.

Figure 5:
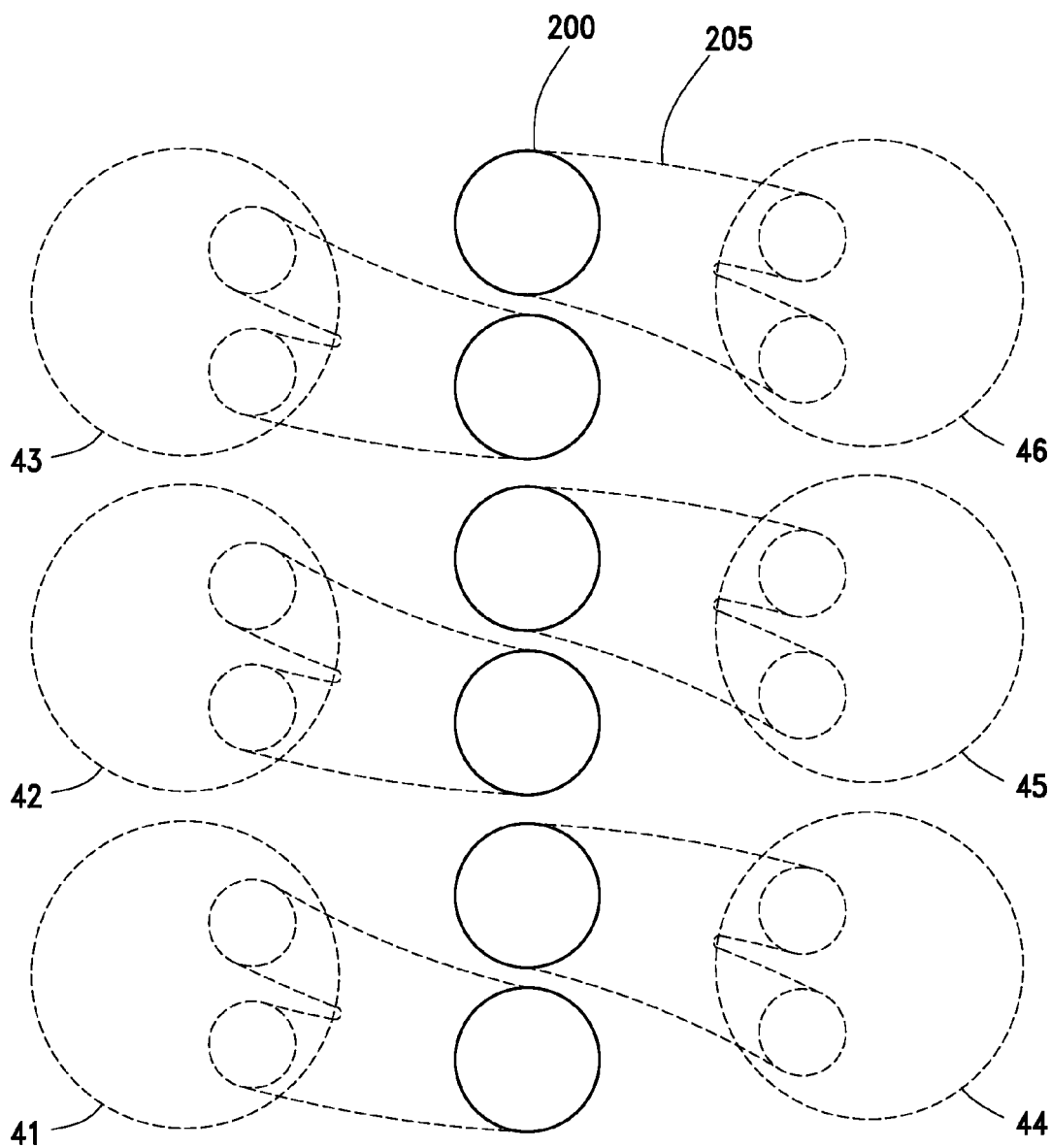
FIG. 5 is a top view of the engine of FIG. 3 showing the engine with six cylinders, along with associated intake ports and passages leading from an intake manifold.

Referring now to FIGS. 2-5, the engine 12 is shown with a cylinder block 28 containing first and second counter-rotating crankshafts 30 and 32. A first series 34 of cooperating pistons and cylinders are mounted in the cylinder block 28 and connected to first crankshaft 30, while a second series 36 of cooperating pistons and cylinders are mounted in the cylinder block 28 and connected to second crank shaft 32. More specifically, cylinders 41-46 slidably receive respective pistons 51-56 thus defining multiple combustion chambers, two of which are shown at 72 and 75 in FIG. 3. The pistons 51-53 connected to the first crankshaft 30, along with their associated cylinders 41-43 as best seen in FIG. 5, collectively constitute the first series 34 of cooperating pistons and cylinders, while the pistons 54-56 connected to the second crankshaft 32, along with their associated cylinders 44-46 as also best seen in FIG. 5, collectively constitute the second series 36 of cooperating pistons and cylinders.

Figure 3:
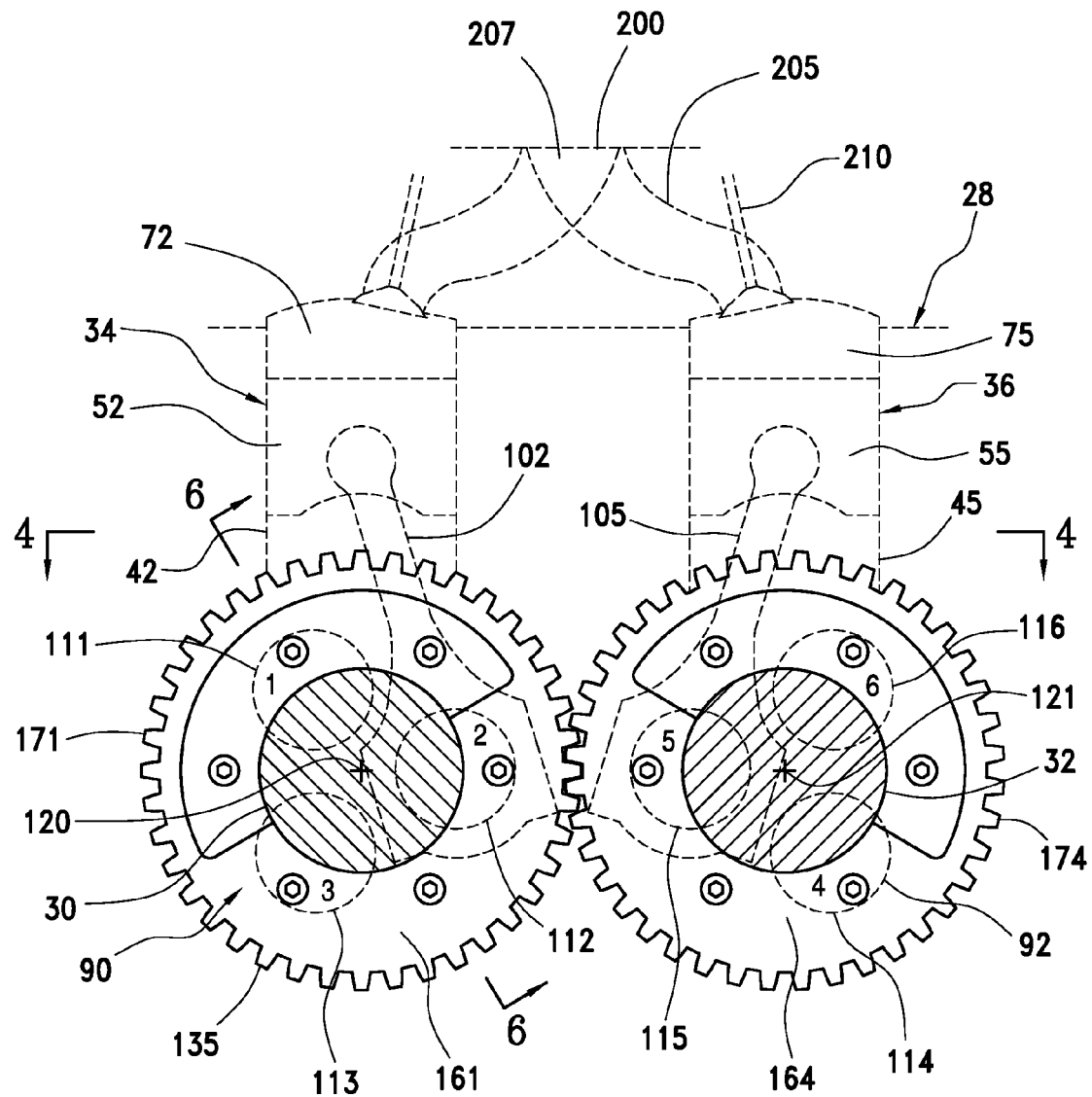
FIG. 3 is an end view of the engine of FIG. 2 showing one of the two gearsets that connect the crankshafts.

Each of the first and second crankshafts 30 and 32 is rotatably mounted on respective main journals 81-84 and 85-88. As one skilled in the art would understand, each main journal 81-88 is rotatably coupled to a main bearing of the engine 12, thereby rotatably coupling the respective crankshafts 30 and 32 to the engine 12. Each of the crankshafts 30, 32 also has a respective plurality of rod journals 90, 92 integrally formed therein. Each connecting rod 101-106 is mated to an associated journal 111-116 on one of the two crankshafts 30, 32. Each connecting rod 101-106 is also connected to an associated reciprocating piston 51-56, thus allowing the pistons 51-56 to drive the crankshafts 30, 32 when the engine 12 is in operation. As best seen in FIG. 3, the first plurality of rod journals 90 includes first, second and third connecting rod journals 111-113 that are evenly spaced around a rotational axis 120 of the first crank shaft 30 such that the journals 111-113 are spaced approximately 120 degrees apart. Similarly, the second plurality of journals, which includes the fourth, fifth and sixth journals 114-116 on the second crankshaft 32, are set 120 degrees apart around a rotational axis 121.

As can be seen from the above discussion, the two crankshafts 30 and 32 are fabricated to be essentially identical to each other and formed of the same distinct shape, but they are installed "end-for-end" so that crankshaft 30, as viewed from the front of the engine 12, has the same direction of rotation and rod journal positions as crankshaft 32, as viewed from the rear of the engine 12. This creates an arrangement that is symmetrical about a central axis 125 as shown in FIG. 4. In this manner, any pitching couples generated by piston linear acceleration forces of the first series 34 cooperating pistons and cylinders are equal in magnitude and phase angle, but opposite in sign to the couples generated by the second series 36 of cooperating pistons and cylinders. Note, for example, the sixth piston 56 closest to the flywheel 26 moves up and down in synchronism with the first piston 51 closest to the motor/generator 24, as can best be seen in FIG. 2 with respect to reference plane 126.

Each crankshaft 30, 32 has a first end 131, 132 and a second end 133, 134 respectively. As best shown in FIG. 4, a first gearset 135 connects the first end 131 of the first crankshaft 30 to the second end 134 of the second crankshaft 32, while a second gearset 136 connects the second end 133 of the first crankshaft 30 to the first end 132 of the second crankshaft 32. With this construction, the two crankshafts 30 and 32 are forced to counter-rotate. In the case of the first crankshaft 30, the first end 131 has a flange 140 integrally formed therein. As shown, the flange 140 is connected to the motor/generator 24. In a single crankshaft engine, the second end of the crankshaft would normally be connected to a flywheel. However, the first crankshaft 30 as shown simply ends at the main journal 84 with or without a thrust surface 141. In the case of the second crankshaft 32, the first end 132 also has a flange 145 integrally formed therein but, in this case, the flange 145 connects to the flywheel 26.

Firing frequency rotational accelerations of the flywheel 26 result in equal and opposite inertial vibration torque imposed upon cylinder block 28. To cancel this torsional excitation of the cylinder block 26, the motor/generator 24 and the flywheel 26 preferably have an equivalent amount of rotational inertia. Since the magnitude of both the clockwise and the counterclockwise rotating inertias are equal to each other and their rotational accelerations are equal but opposite, the reactions that they impose upon the cylinder block 28 mutually cancel, and the block 28 does not vibrate from internal inertial forces. This cancellation of the crankshaft's torsional reaction against the cylinder block structure 28 presents an opportunity. Since the cylinder block structure 28 has less vibration in response to crankshaft torsional vibrations than a conventional engine, the engine 12 may be operated in more fuel efficient modes where the crankshaft vibration increases. One example of a more fuel efficient mode of operation that increases crankshaft torsional vibration is cylinder deactivation, sometimes referred to as "variable displacement internal combustion" engine (VDIC). The present invention allows selective disabling or re-enabling of cylinders 41-46 from the first 34 and second 36 series of cooperating pistons and cylinders in accordance with power requirements of the vehicle 10. Current production VDIC equipped vehicles are calibrated to avoid cylinder deactivation under many conditions where the engine 12 with deactivated cylinders could produce adequate power, but the resulting vehicle NVH (noise vibration and harshness) would be unacceptable. Furthermore, the increase of cylinder block width, to enclose two crankshafts 30, 32 and two banks of cylinders 41-43 and 44-46 in one integral structure, functions to stiffen the cylinder block 28 and reduce vibrations and radiated sound from the engine 12. The motor/generator 24 serves to capture vehicle kinetic energy during deceleration as well as to add torque to enhance vehicle acceleration.

The motor generator 24 can also be used as an "active flywheel". A control strategy for using a starter as an "active flywheel" is disclosed in U.S. Pat. No. 6,256,473, which is incorporated herein by reference. The additional rotating inertia of the motor/generator 24, along with the ability of the motor/generator 24 to create or absorb torque, also allows the engine 12 to operate with a more efficient combustion process, such as HCCI (Homogeneous Charge Compression Ignition). The motor/generator 24, with dynamic torque control, can remove torque from strong combustion events and add torque to weak combustion events. This torque compensation, along with the cancellation of the crankshaft internal inertial reaction torque on the cylinder block 28 allows reliable and smooth engine operation with a combustion process that may have reduced robustness in favor of more efficiency.

As shown in FIG. 1, the flange 140 may also provide a mounting place for various ancillary equipment, generally indicated at 148 in FIG. 1, such as a camshaft drive mechanism, an engine driven coolant pump, a power steering pump, climate control system, fan belt pulleys, or the like. Power from the engine 12 could be taken from either end of either crankshaft 30, 32 in either hand of rotation as long as the two crankshafts 30, 32 have essentially symmetrical construction with equivalent rotating inertias and opposite directions of rotation. Preferably, the total inertia of the ancillary equipment 148 that is tightly coupled to the crankshaft 30 and the motor/generator 24 is the same as the inertia of the flywheel 26. The motor/generator 24, with inertia mass equivalent to the flywheel 26 or torque converter, has very large current generating capacity, even at engine idle, and could enable electrical powering of various ancillary equipment 148 that are normally driven mechanically by a belt from a crankshaft. Conventionally, an engine driven coolant pump and a power steering pump are sized for their most severe operating conditions, and during other engine operating conditions they are over-driven and waste much energy. Even with the conversion inefficiencies between electrical and mechanical energy, these machines would be more efficient if they were electrically driven at speeds in accordance with need. Technically, the vehicle 10 is not a full hybrid because the engine 12 will always be running when vehicle propulsion is needed. Regardless, the large electric motor/generator 24 could crank the engine 12 and bring it up to speed very quickly and quietly, so that if the vehicle 10 is equipped with an electrically powered climate control system or other ancillary equipment 148 powered from a rechargeable battery, the engine 12 may shut off whenever it is not needed for vehicle propulsion and restarted again, as needed, without adversely affecting the comfort of passengers or the drivability of the vehicle 10.

Furthermore, each crankshaft 30, 32 includes two types of integral counterweights as shown in FIG. 4. Counterweights 152*a*, 152*b*, 155*a* and 155*b* for the second and fifth pistons 52, 55 are formed as two parallel lobed weights. The counterweights for the first, third, fourth and sixth pistons 51, 53, 54, 56 include a respective one lobed weight 151, 153, 154, 156 and a respective weight 161, 163, 164, 166 that is incorporated into respective gears 171, 173, 174, 176. As can best be seen in FIG. 6, the crankshaft cheek 191 is provided with at least two annularly placed holes 181 and 182. The gear 171 is also provided with holes 183 and 184 that align with the holes 181 and 182 in the cheek 191. Threaded fasteners 185 and 186 pass through respective aligned ones of the holes 181, 182, 183, 184 to secure the gear 171 to the cheek 191 and thus to the crankshaft 30. The counterweights 152*a*, 152*b*, 155*a*, 155*b*, 151, 153, 154, 156, 161, 163, 164, 166 have the appropriate masses and are located to generate forces on the crankshafts 30, 32 that cancel the lateral first order forces imposed on the crankshafts 30, 32 by the acceleration forces of the connecting rods 101-106. First order unbalance refers to the forces and couples that vary as a sinusoidal function with one cycle of force occurring with each rotation of the crankshaft. Second order unbalance is caused by the changing vertical force components based on the varying vertical component of the connecting rod lengths caused by the cyclical inclinations of the rods 101-106 due to lateral movement of the associated journals 111-116.

Preferably, pistons 51-56 and their associated connecting parts have the same reciprocating mass and stroke, and each crankshaft 30, 32 has equal angular and axial spacing between rod journals 111-116 so that the reciprocating pistons 51-56 and connecting rods 101-106 coupled to each crankshaft 30, 32 generate no unbalanced shaking forces or moments. Symmetry of construction achieves substantially perfect balance of the engine 12. The crankshafts 30, 32 are far enough apart to prevent interference between the connecting rods 102, 105, as illustrated in phantom lines in FIG. 4. The first series 34 of cooperating pistons and cylinders and the second series 36 of cooperating pistons and cylinders are preferably equidistant fore and aft, as illustrated, so that the engine 12 will have minimum length, and the block 28 will have maximum strength and stiffness. This overall arrangement will function to cancel those first order vibrations not cancelled by the counterweights 152a, 152b, 155a, 155b, 151, 153, 154, 156, 161, 163, 164, 166, while also canceling any second order vibrations due to the symmetry of the engine 12 about axis 125.

FIGS. 3 and 5 illustrate how an intake manifold 200 is preferably oriented above the engine 10 in a fashion that advantageously provides the same length passages 205 between the manifold plenum 207 and the intake valves 210 of every cylinder 41-46.

Figures 6, 7:
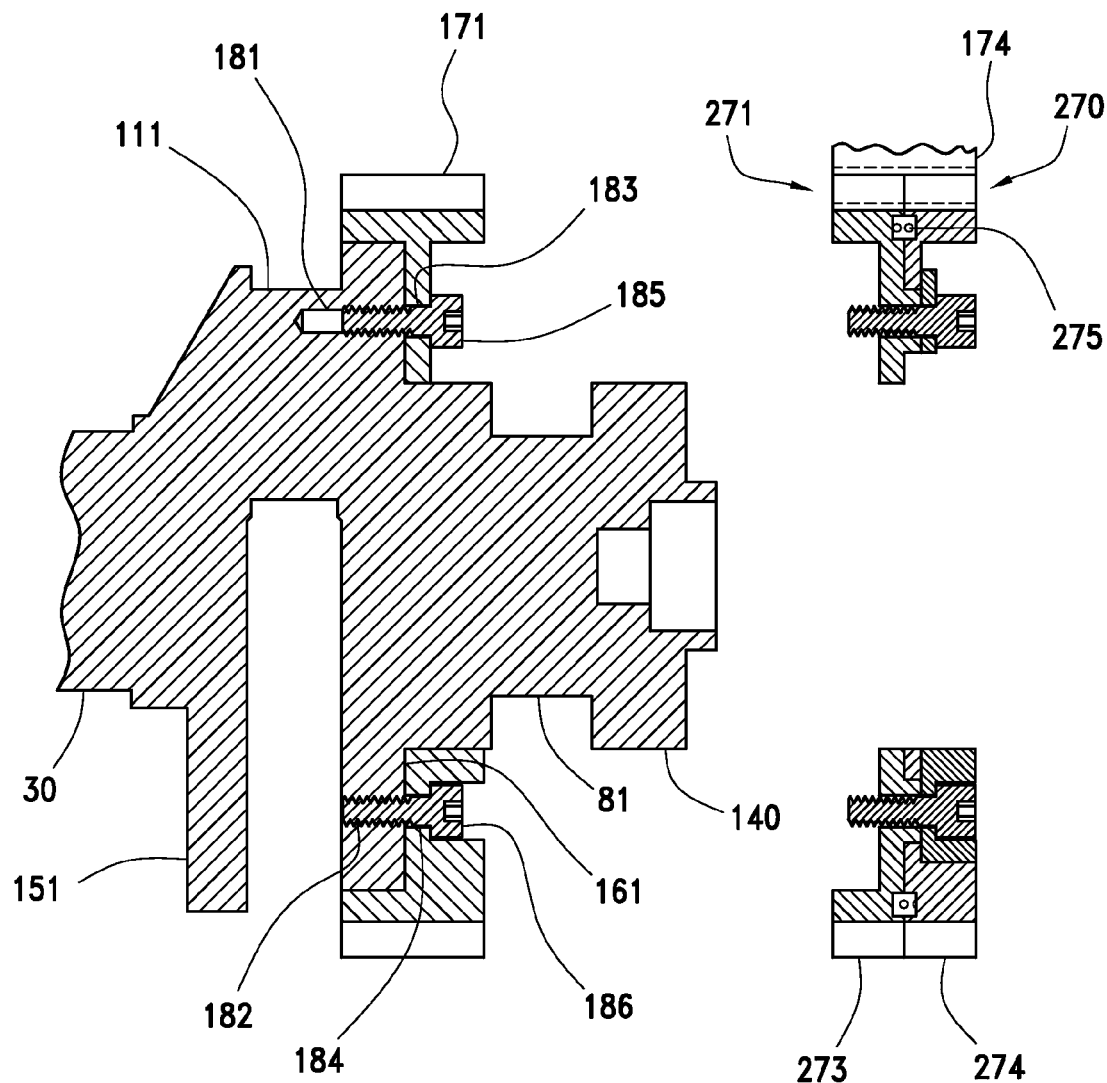
FIG. 6 is a cross-sectional view of the engine of FIG. 3 taken along line 6-6, showing details of a gear that is incorporated into one of the counterweights on the crankshaft.
FIG. 7 shows an embodiment where the gear of FIG. 6 is a scissors gear.

Since gear sets 135 and 136 are driven directly from the crankshafts 30 and 32, the gear sets 135, 136 have the potential to be very noisy due to the crankshafts' torsional vibrations causing rattle between the gears 171, 173, 174, 176. A properly designed scissors gear set 270, shown in FIG. 7, is therefore provided to eliminate rattle between the gears 171, 173, 174, 176. The scissors gear set 270 includes a one-piece gear 174 on the crankshaft 32 meshing with a split gear 271 on the crankshaft 30. The split gear 271 has a first rigid portion 273 that is attached to the crankshaft 30, while a second spring-loaded portion 274 is rotationally biased relative to the first portion 273 by a spring 275. In operation, the first rigid portion 273 transfers torque to the gear 174 in one direction of torque, while the second spring-loaded portion 274, through the spring 275, transfers torque to the mating gear 174 in the opposite direction of torque. If the spring pre-load is greater than the maximum reverse torque that the second spring-loaded portion 274 of the gear set 270 must carry, the gear set 270 will not rattle. Since the crankshaft 32 receives very large input torques in both the forward and backward directions, the scissors gear set 270 is designed so that the spring 275 is very strong.

In another preferred embodiment of the invention, the torsional flexibility of the crankshafts 30, 32 is used to reduce vibration instead of using the scissors gear set 270. This is done when mounting the gear sets 135, 136 between the crankshafts 30, 32 at both ends of the engine 12. More specifically, the first three gears 171, 173, 174 are clamped to the crankshafts 30, 32 as they are installed into the engine 12. Then the fourth gear 176 is placed, but not clamped, so that it is free to rotate slightly relative to crankshaft 32. The ends 132, 133 of the crankshafts 30, 32 near the unclamped gear 176 can be twisted relative to each other and held in the twisted position while the last gear 176 is clamped in place to provide a torsional preload. The twisted crankshafts 30, 32 serve as preload springs for the gear sets 135, 136, thereby eliminating gear rattle by preloading the first and second crankshafts 30, 32 with a rotational tension stored in the torsional flexibility of each shaft 30, 32. Preferably, one crankshaft 30 carries two gears 171, 173 with a handed helix, while the other crankshaft 32 carries two gears 174, 176 with an opposite handed helix. In this manner, the thrust loads generated by the torsional preload will create both fore and aft thrust on each crankshaft 30, 32, allowing the thrusts from the preload to cancel within each crankshaft 30, 32 without imposing extra loads on the crankshaft support bearings.

The engine configuration described in this invention disclosure provides near perfect internal balance of piston acceleration forces, unlike conventional single crankshaft V6 engines, and it will provide near perfect internal balance of rotational accelerations of the flywheel, unlike all conventional single crankshaft engines. Furthermore, the upper portion of this dual crankshaft engine is narrower than that of conventional V6 and V8 engines. Although described with reference to a preferred embodiment of the invention, it should be readily understood that various changes and/or modifications could be made to the invention without departing from the spirit thereof. For instance, both crankshafts could be offset from the plane of their corresponding cylinders to reduce piston side loading during the power stroke, as long as symmetry is maintained with both crankshafts having the same magnitude of offset. The shown engine has three cylinders in each bank, however each crankshaft may have more cylinders so long as the rows of cylinders each have the same number of cylinders. If the engine assembly has fewer than six cylinders, such as was done in the construction of the Ariel Square Four motorcycle engine, balance shafts or another balancing mechanism would be required to achieve the desired engine balance. In general, the invention is only intended to be limited by the scope of the following claims.

The invention claimed is:

1. A dual crankshaft internal combustion engine for a vehicle comprising:
   a cylinder block;
   a first series of cooperating pistons and cylinders mounted in the cylinder block;
   a second series of cooperating pistons and cylinders mounted in the cylinder block;
   a first crankshaft having a first end, a second end, a torsional flexibility and a shape, the first crankshaft being housed within the cylinder block and connected to the first series of cooperating pistons and cylinders, such that movement of the pistons of the first series within the cylinders of the first series causes the first crankshaft to rotate;
   a second crankshaft having a first end, a second end, a torsional flexibility and a shape substantially identical to the shape of the first crankshaft, the second crankshaft being housed within the cylinder block, connected to the second series of cooperating pistons and cylinders and positioned parallel to the first crankshaft, with the first end of the first crankshaft being positioned adjacent to the second end of the second crankshaft;
   a first gearset mounted in the internal combustion engine and connecting the first end of the first crankshaft to the second end of the second crankshaft;
   a second gearset mounted in the internal combustion engine and connecting the second end of the first crankshaft to the first end of the second crankshaft;
   a first mass having an inertia connected to the first end of the first crankshaft;
   a second mass having substantially the same inertia as the first mass connected to the first end of the second crankshaft;
   whereby the first and second crankshafts counter rotate and various forces and moments produced by the pistons and rotating crankshafts are balanced.

2. The engine of claim 1 wherein the gears on the first crankshaft has a handed helix and the gears on the second crankshaft have an oppositely handed helix as compared to the handed helix of the gears on the first crankshaft.

3. The engine of claim 1 wherein the second mass is a flywheel.

4. The engine of claim 1 wherein the second mass is a torque converter.

5. The engine of claim 1 wherein the first mass is a motor/generator.

6. The engine of claim 1 wherein the first gearset includes a scissors gear.

7. The engine of claim 1 wherein the first and second crankshafts are preloaded with a rotational tension stored in the torsional flexibility of each shaft.

8. A vehicle comprising:
a body;
a plurality of wheels;
a dual crankshaft internal combustion engine including:
   a cylinder block;
   a first series of cooperating pistons and cylinders mounted in the cylinder block;
   a second series of cooperating pistons and cylinders mounted in the cylinder block;
   a first crankshaft having a first end, a second end, a torsional flexibility and a shape, the first crankshaft being housed within the cylinder block and connected to the first series of cooperating pistons and cylinders such that movement of the pistons of the first series within the cylinders of the first series causes the first crankshaft to rotate;
   a second crankshaft having a first end, a second end, a torsional flexibility and a shape substantially identical to the shape of the first crankshaft, the second crankshaft being housed within the cylinder block, connected to the second series of cooperating pistons and cylinders and positioned parallel to the first crankshaft, with the first end of the first crankshaft being positioned adjacent the second end of the second crankshaft;
   a first gearset mounted in the internal combustion engine and connecting the first end of the first crankshaft to the second end of the second crankshaft;
   a second gearset mounted in the internal combustion engine and connecting the second end of the first crankshaft to the first end of the second crankshaft;
   a first mass having an inertia connected to the first end of the first crankshaft; and
   a second mass having substantially the same inertia as the first mass connected to the first end of the second crankshaft;
   whereby the first and second crankshafts counter rotate and various forces and moments produced by the pistons and rotating crankshafts are balanced; and
a powertrain interconnecting the internal combustion engine to at least one of the plurality of wheels.

9. The vehicle of claim 8 wherein on the first crankshaft gears have a handed helix and the second crankshaft gears have an oppositely handed helix as compared to the handed helix of the gears on the first crankshaft.

10. The vehicle of claim 8 wherein the second mass is a flywheel.

11. The vehicle of claim 8 wherein the second mass is a torque converter.

12. The vehicle of claim 8 wherein the first mass is a motor/generator, and the vehicle is a hybrid vehicle.

13. The vehicle of claim 8 wherein the first gearset includes a scissors gear.

14. The vehicle of claim 8 wherein the first and second crankshafts are preloaded with a rotational tension stored in the torsional flexibility of each of the first and second crankshafts.

15. A method for balancing a dual crankshaft internal combustion engine in a vehicle comprising:
mounting first and second series of cooperating pistons and cylinders in a cylinder block;
positioning a first crankshaft parallel to a second crankshaft in the cylinder block, with a first end of the first crankshaft being positioned adjacent a second end of the second crankshaft;
connecting the first end of the first crankshaft to a first mass and connecting the first end of the second crankshaft to a second mass having the same amount of inertia as the first mass;
counter-rotating the first and second crankshafts to balance various forces and moments produced by the pistons and rotating crankshafts.

16. The method of claim 15 further comprising eliminating gear rattle by placing a scissors gear in the gearset.

17. The method of claim 15 further comprising eliminating gear rattle by preloading the first and second crankshafts with a rotational tension stored in torsional flexibility of each of the first and second crankshafts.

18. The method of claim 15 further comprising operating the internal combustion engine with a firing order wherein no two cylinders of the first series of cooperating pistons and cylinders, which is on the first crankshaft, fire simultaneously.

19. The method of claim 15 further comprising selectively disabling or re-enabling the firing of cylinders from the first and second series of cooperating pistons and cylinders, in accordance with power requirements of the vehicle.

20. The method of claim 15 further comprising operating with the internal combustion engine with a homogeneous charge compression ignition combustion process.

\* \* \* \* \*